United States Patent
Oh et al.

(10) Patent No.: US 9,759,325 B2
(45) Date of Patent: Sep. 12, 2017

(54) CYLINDER DEVICE HAVING IMPROVED WEAR RESISTANCE THROUGH OPTIMAL ARRANGEMENT OF FINE TEXTURES

(71) Applicant: DOOSAN INFRACORE CO., LTD., Incheon (KR)

(72) Inventors: Seok Ju Oh, Gyeonggi-do (KR); Sung Gi Kim, Gyeonggi-do (KR); Kyu Bong Han, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 402 days.

(21) Appl. No.: 14/365,481

(22) PCT Filed: Dec. 17, 2012

(86) PCT No.: PCT/KR2012/010987
§ 371 (c)(1),
(2) Date: Jun. 13, 2014

(87) PCT Pub. No.: WO2013/094944
PCT Pub. Date: Jun. 27, 2013

(65) Prior Publication Data
US 2014/0345453 A1     Nov. 27, 2014

(30) Foreign Application Priority Data

Dec. 19, 2011  (KR) .................. 10-2011-0137703
Dec. 19, 2011  (KR) .................. 10-2011-0137705

(51) Int. Cl.
*F02F 1/20*     (2006.01)
*F16J 10/02*    (2006.01)
(Continued)

(52) U.S. Cl.
CPC ............ *F16J 10/02* (2013.01); *F02F 1/004* (2013.01); *F02F 1/20* (2013.01); *F16J 10/04* (2013.01)

(58) Field of Classification Search
CPC ..... F16J 10/04; F16J 10/02; F02F 1/20; F02F 1/004
See application file for complete search history.

(56) References Cited

U.S. PATENT DOCUMENTS

| | | | |
|---|---|---|---|
| 7,104,240 B1 * | 9/2006 | Vuk .................... | F02F 1/20 123/193.2 |
| 7,685,991 B2 * | 3/2010 | Cumming ............ | F02F 1/20 123/305 |
| 8,381,696 B2 * | 2/2013 | Urabe .................. | F02F 1/20 123/193.2 |

FOREIGN PATENT DOCUMENTS

| | | |
|---|---|---|
| JP | H08200145 | 8/1996 |
| JP | 2007046660 A | 2/2007 |

(Continued)

OTHER PUBLICATIONS

Chinese Office Action dated Oct. 30, 2015 for Chinese Application No. 201280063003.9, 5 pages.

(Continued)

*Primary Examiner* — Logan Kraft
*Assistant Examiner* — Abiy Teka
(74) *Attorney, Agent, or Firm* — John D. Veldhuis-Kroeze; Westman, Champlin & Koehler, P.A.

(57) ABSTRACT

There is provided a cylinder device having optimal arrangement of fine textures and optimal surface roughness capable of reducing wear of a cylinder bore side and a piston ring by processing fine textures in an optimal selection region of the cylinder bore side to improve lubrication characteristics between the piston ring and the cylinder bore side while (Continued)

reducing engine oil consumption by processing surface roughness of the cylinder bore side to an optimal status.

6 Claims, 9 Drawing Sheets

(51) Int. Cl.
*F16J 10/04* (2006.01)
*F02F 1/00* (2006.01)

(56) References Cited

FOREIGN PATENT DOCUMENTS

| | | |
|---|---|---|
| JP | 2010255847 | 11/2010 |
| KR | 20110026739 | 3/2011 |
| KR | 20110071176 | 6/2011 |

OTHER PUBLICATIONS

Search Report dated Mar. 18, 2013 and written in Korean with English translation for International Patent Application No. PCT/KR2012/010987 filed Dec. 17, 2012, 5 pages.

\* cited by examiner

CYLINDER DEVICE HAVING IMPROVED WEAR RESISTANCE THROUGH OPTIMAL ARRANGEMENT OF FINE TEXTURES

CROSS-REFERENCE TO RELATED APPLICATION

This Application is a Section 371 National Stage Application of International Application No. PCT/KR2012/010987, filed Dec. 17, 2012 and published, not in English, as WO 2013/094944 on Jun. 27, 2013.

FIELD OF THE DISCLOSURE

The present disclosure relates to a cylinder device having improved wear resistance through optimal arrangement of fine textures capable of reducing wear of a piston ring and a cylinder bore side due to friction by forming fine textures in consideration of an operating environment of an internal combustion engine near top dead center and bottom dead center of a piston.

The present disclosure also relates to a cylinder device having improved wear resistance through optimal arrangement of fine textures capable of reducing wear caused by directly coming in contact with a piston by reducing a secondary motion caused by friction when the piston moves in a straight-line reciprocating motion.

The present disclosure also relates to a cylinder device having optimal arrangement of fine textures and optimal surface roughness capable of reducing engine oil consumption by processing surface roughness of a cylinder bore side to an optimal status.

BACKGROUND OF THE DISCLOSURE

An internal combustion engine uses a cylinder device moved by an explosive power generated by the combustion of a fuel. A gasoline engine or a diesel engine operates the cylinder device by an explosive power by spraying a fuel together with air for combustion into the cylinder device and then by igniting and exploding the fuel.

Figure 1:
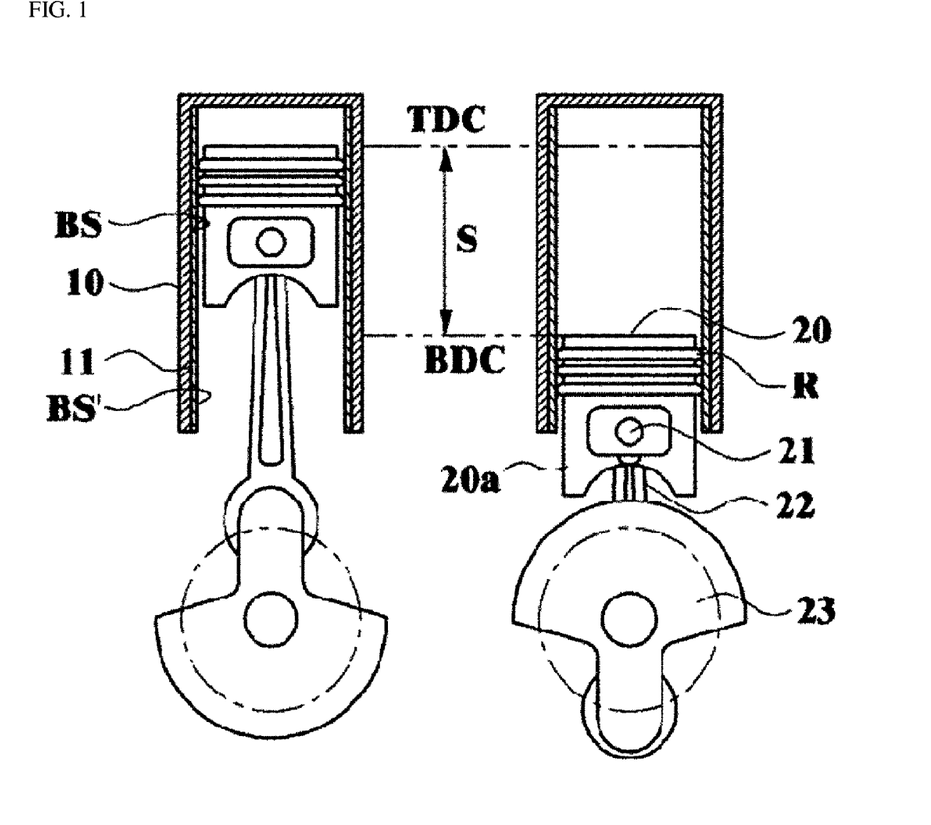
FIG. 1 is a front cross-sectional view of a typical cylinder device.

As shown in FIG. 1, the cylinder device includes a cylinder block 10 and a piston 20 that moves in a straight-line reciprocating motion within the cylinder block 10, and a cylinder liner 11 having excellent wear resistance may be inserted into the cylinder block 10 when necessary.

Accordingly, when the cylinder liner 11 is not additionally inserted, an inner surface of the cylinder block 10 serves as a cylinder bore side BS, and when the cylinder liner 11 is additionally inserted, an inner surface of the cylinder liner 11 serves as a cylinder bore side BS'.

Further, a piston ring R is fitted to a top of the piston 20 moving along the inside of the cylinder block 10, and a bottom of the piston 20 is provided with a piston skirt 20a. Further, the piston 20 is connected to a connecting rod 22 through a piston pin 21, the connecting rod 22 is connected to a crankshaft 23, and a CRS rotational shaft is fitted to the crankshaft 23.

Meanwhile, in the above-described cylinder device, when a contact surface pressure between the piston 20 and the cylinder bore side BS or BS' which cause a relative motion is high and a sliding speed when moving in the relative motion is slow, two contact surfaces enter a mixed lubrication state in which solid contact or a boundary lubrication state is mixed.

In the mixed lubrication state, the solid contact leads to a rapid rise in temperature in fine areas of two surfaces, and the temperature rise causes plastic deformation and fatigue failure on the two surfaces. For this reason, wear particles broken from any one surface of the two surfaces further increase friction and wear on the contact surfaces.

Accordingly, in order to enhance lubrication performance on the two contact surfaces moving in the relative motion in the mixed lubrication state, a method of processing fine textures on the cylinder bore side BS or BS' has recently been attempted.

As the method of processing the fine textures, there are a method using a laser (Laser Surface Texturing; LST), a machining method using a machine tool, an ion beam processing method using electrical or physical energy of ions dissociated from gases in a vacuum state, and a processing method using a semiconductor etching process.

As mentioned above, when the fine textures are formed on the cylinder bore side BS or BS' through the above-stated processing methods, since it is already known that the fine textures cause a fluid dynamic-pressure effect, store a lubricant, and collect the wear particles, the fine textures formed on the cylinder bore side have been studied in various fields.

Unfortunately, in order to minimize friction and wear by processing the fine textures, it is very important to determine the shape and arrangement of the textures so as to be appropriate for operating conditions of machine elements.

That is, since the shape and arrangement of the fine textures capable of minimizing friction and wear are largely affected by physical restraint conditions and operating conditions such as a contact type, an applied load, and a sliding speed of two objects that move in a relative motion, there is much difficulty in finding an optimum point at which friction and wear are minimized. Particularly, a sliding motion is caused between the cylinder liner 11 for an engine and the piston 20, and conditions of the sliding motion continue to change.

Furthermore, since the piston 20 connected to the crankshaft 23 through the connecting rod 22 moves in a straight-line reciprocating motion in an axial direction of the cylinder bore side BS or BS', a sliding speed becomes zero (0) at top dead center TDC and bottom dead center BDC, whereas the sliding speed continues to change on the contact surfaces of the cylinder bore side BS or BS' and the piston 20.

Moreover, since the sliding speed becomes zero (0) at the top dead center TDC and bottom dead center BDC, the two contact surfaces enter the mixed lubrication state in which solid contact or a boundary lubrication state is mixed. Particularly, since a high-temperature operating environment is set up near the top dead center TDC due to an explosion stroke, viscosity of the lubricant is low. Thus, the cylinder liner 11 and the piston ring R is under a poorer wear and friction environment.

Accordingly, as the engine operating environment becomes worse so as to be prone to wear the piston ring R, a method capable of further reducing the wear of the piston ring R than the typical method is needed.

In addition, the piston 20 of the internal combustion engine moves in a pivoting motion around the piston pin 21 while reciprocating at a stroke distance S due to a combustion pressure or a frictional force generated between the piston ring R and the cylinder bore side BS or BS', and the pivoting motion is called a piston secondary motion.

Accordingly, since the cylinder bore side BS or BS' comes in direct contact with the piston 20 as well as the piston ring R due to the pivoting motion of the secondary motion, there is a problem in that the amount of wear of the cylinder bore side BS or BS' is further increased due to the direct contact caused by the pivoting motion of the piston 20.

Meanwhile, in order to reduce the wear of the cylinder bore side BS or BS', a method such as heat treatment, surface roughness improvement or honing has been conventionally used. However, in recent years, as the engine operating environment becomes worse so as to be prone to wear the piston ring R and the cylinder bore side BS or BS', there is a need for a method capable of further effectively reducing the wear of the cylinder bore side BS or BS' and the piston ring R that the typical method.

For this reason, Korean Patent Laid-Open Publication No. 2011-26739 suggests a processing method capable of enhancing lubrication performance while reducing manufacturing cost and processing time by processing the fine textures on the cylinder bore side BS or BS' so as to further reduce the wear of the piston ring R and the cylinder bore side BS or BS' than the method such as heat treatment, surface roughness improvement or honing.

Disadvantageously, since the method of processing the fine textures does not solve the wear caused by a great change in an instantaneous speed at the top dead center TDC and the bottom dead center BDC when the piston 20 reciprocates and does not also solve the wear caused by the pivoting motion of the piston secondary motion, the method of processing the fine textures does not provide an optimum effect.

In addition, engine oil consumption is one of serious problems caused between the cylinder bore side BS or BS' and the piston. The engine oil consumption is mostly caused between the cylinder bore side BS or BS' and the piston 20, and major causes thereof are as follows.

That is, engine oil stays between fine honing grooves on the cylinder bore side BS or BS', and the oil vaporizes at a high-temperature condition or is introduced into a combustion chamber through the piston ring R in a rising stroke of the piston. Since the introduced engine oil is combusted during the combustion, the engine oil is consumed.

In order to reduce the engine oil consumption, the deformation of a cylinder bore may be minimized or the shape and tension of the piston ring R may be adjusted. However, since the deformation of the cylinder bore is mostly caused when a cylinder head (not shown) is fastened to an upper end of the cylinder block 10 at which the cylinder bore is positioned, it is required to reduce the engine oil consumption by slightly reducing the matching of the piston ring R with the cylinder bore side BS or BS'.

That is, the piston ring R include a top ring, a second ring, and an oil ring. At this time, it is require to reduce the engine oil consumption while preventing a deterioration in the lubrication performance by optimizing conditions of the rings. For this reason, a method of minimizing tension of the piston ring R is recently used to enhance engine fuel efficiency, but when the tension of the piston ring R is too reduced, there is a problem in that the engine oil consumption is further increased.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

In order to solve the aforementioned problems, the present disclosure provides a cylinder device having optimal arrangement of fine textures and optimal surface roughness capable of reducing wear of a cylinder bore side and a piston ring by processing fine textures in an optimal selection region of the cylinder bore side to improve lubrication characteristics between the piston ring and the cylinder bore side while reducing engine oil consumption by processing surface roughness of the cylinder bore side to an optimal status.

The present disclosure also provides a cylinder device having improved wear resistance through optimal arrangement of fine textures capable of reducing wear caused by directly coming in contact with a piston by reducing a secondary motion caused by friction when the piston moves in a straight-line reciprocating motion.

According to one aspect of the present disclosure, there is provided a cylinder device having optimal arrangement of fine textures and optimal surface roughness. The device includes a texture section that is formed on a cylinder bore side within a cylinder block the texture section having a plurality of fine textures in a region of 8% to 32% from top dead center of a piston moving in a straight-line reciprocating motion along the cylinder bore side.

At this time, the fine textures may be preferably fine grooves having a dimple shape of a circular cross section.

Furthermore, the fine groove may preferably have a diameter (Db) of 0.07 mm to 0.17 mm, a depth (Dc) of 0.01 mm to 0.03 mm, and a density of 5% to 15%.

Moreover, a region of the cylinder bore side within a stroke distance of the piston may preferably have a surface roughness (Ra) of 0.18 to 0.40.

According to another aspect of the present disclosure, there is provided a cylinder device having improved wear resistance through optimal arrangement of fine textures. The device includes a first texture section that is formed on a cylinder bore side within a cylinder block the first texture section having a plurality of fine textures in a region of 5% to 35% from top dead center of a piston moving in a straight-line reciprocating motion along the cylinder bore side, and a second texture section that is formed on the cylinder bore side within the cylinder block the second texture section having a plurality of fine textures in a range of 100% to 140% from the top dead center of the piston.

At this time, the second texture section may be preferably formed by processing the plurality of fine textures in a range of 110% to 130% from the top dead center of the piston, and the second texture section may be formed in a range of 120° to 180° from a central point of a thrust side existing on the cylinder bore side, may be formed in a range of 120° to 180° from a central point of an anti-thrust side existing on the cylinder bore side, or may be formed in both of the range of 120° to 180° from the central point of the thrust side and the range of 120° to 180° from the central point of the anti-thrust side.

Further, the fine textures of the first texture section and second texture section may be preferably fine grooves having a dimple shape of a circular cross section.

Furthermore, the fine groove may preferably have a diameter of 100 μm to 150 μm, a depth of 10 μm to 20 μm, and an arrangement distance of 350 μm to 450 μm.

In accordance with the cylinder device having optimal arrangement of fine textures and optimal surface roughness according to the present disclosure, it is possible to reduce wear of the piston ring and the cylinder bore side due to friction by forming fine textures that maintain oil films formed on the cylinder bore side and collect fine wear particles.

Furthermore, it is possible to reduce engine oil consumption while reducing wear as mentioned above by processing surface roughness of the cylinder bores side to an optimal status to suppress engine oil of a cylinder bore from being introduced into a combustion space in a rising stroke of the piston.

Moreover, in accordance with the cylinder device having improved wear resistance through optimal arrangement of fine textures according to the present disclosure, it is possible to also reduce wear caused by coming in contact with the piston by forming the above-stated fine textures on the thrust side and the anti-thrust side to reduce a secondary motion caused by friction when the piston moves in a straight-line reciprocating motion.

Description of Main Reference Numerals of Drawings

10: Cylinder block
11: Cylinder liner
20: Piston
20a: Skirt
21: Piston pin
22: Connecting rod
23: Crankshaft CRS
30: Texture section, first texture (groove)
31 and 41: Fine texture
40 and 40a: Second texture (groove)
BS and BS': Cyinder bore side
R: Piston ring

DETAILED DESCRIPTION

Hereinafter, a cylinder device having optimal arrangement of fine textures and optimal surface roughness according to an exemplary embodiment of the present disclosure will be described with reference to the accompanying drawings.

A cylinder bore side BS or BS' to be described below means a side coming in direct contact with the piston 20 moving a straight-line reciprocating motion, and when the cylinder liner 11 is not additionally inserted as shown in FIG. 1, the inner surface of the cylinder block 10 serves as a cylinder bore side BS.

Meanwhile, when the cylinder liner 11 is additionally inserted, the inner surface of the cylinder liner 11 serves as a cylinder bore side BS', and when a coated layer (not shown) coated with various films exists on the inner surface of the cylinder block 10, the coated layer serves as a cylinder bore side.

Figure 2:
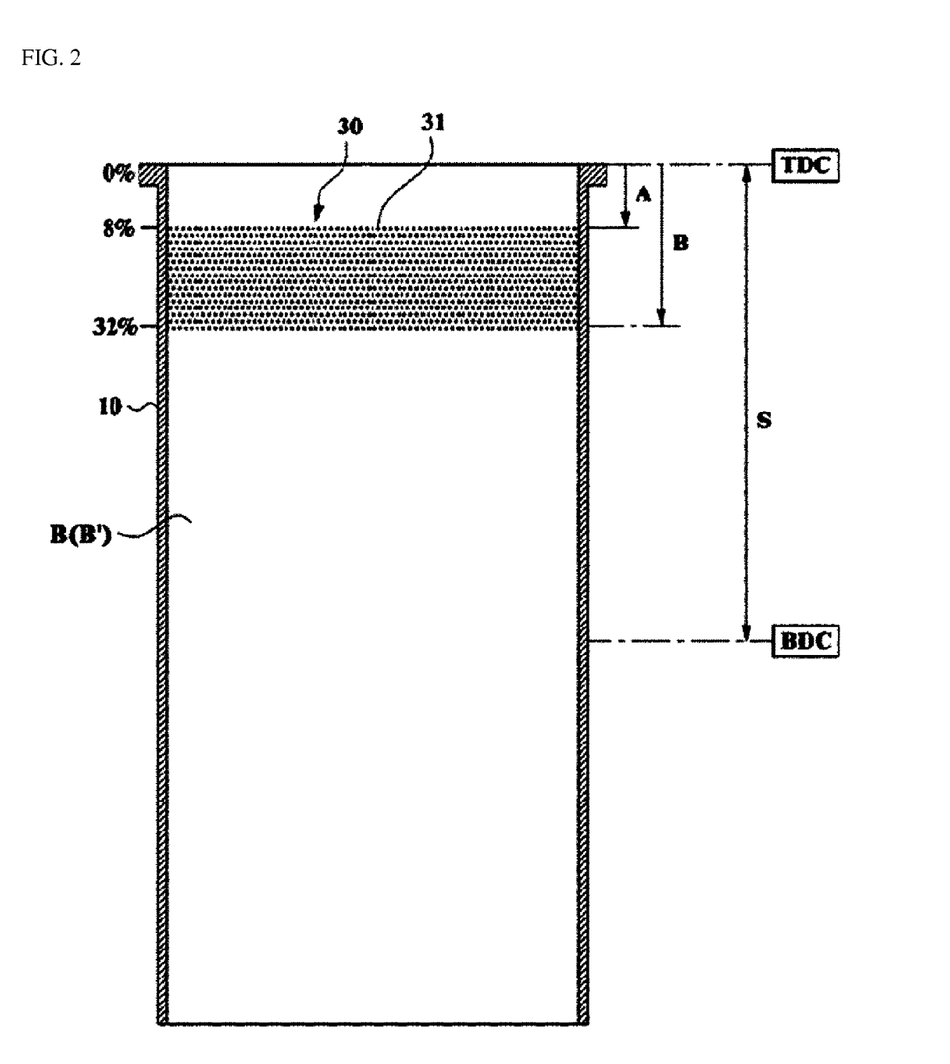
FIG. 2 is a partial view illustrating a cylinder device having optimal arrangement of fine textures and optimal surface roughness according to an exemplary embodiment of the present disclosure.

As shown in FIG. 2, the cylinder device having optimal arrangement of fine textures and optimal surface roughness according to an exemplary embodiment of the present disclosure includes a texture section 30 that is formed on a cylinder bore side BS or BS' within a cylinder block 10 and is formed near top dead center TDC of a piston 20 moving in a straight-line reciprocating motion within a stroke distance S.

At this time, in order to reduce friction and wear by forming fine textures on the cylinder bore side BS or BS', it is required to optimally determine the shape, arrangement and processing region of the fine textures, and the shape, arrangement and processing region of the textures capable of minimizing friction and wear are largely affected by operating conditions such as a load, a sliding speed, and a contact type of two surfaces.

For example, the shape and arrangement of the textures capable of minimizing friction and wear are changed depending on a contact type of contact portions such as line contact, point contact, or surface contact. Accordingly, it is required to firstly decide an operating environment or operating condition prior to the development of a surface texture technology capable of reducing friction and wear, and it is required to select the shape and arrangement of the fine textures under the decided operating environment or operating condition.

Accordingly, the texture section 30 of an exemplary embodiment of the present disclosure is formed by processing a plurality of fine textures 31 in a region (between A and B) in a range of 8% to 32% from top dead center TDC of the piston 20 moving in a straight-line reciprocating motion along the cylinder bore side BS or BS'.

Figure 3:
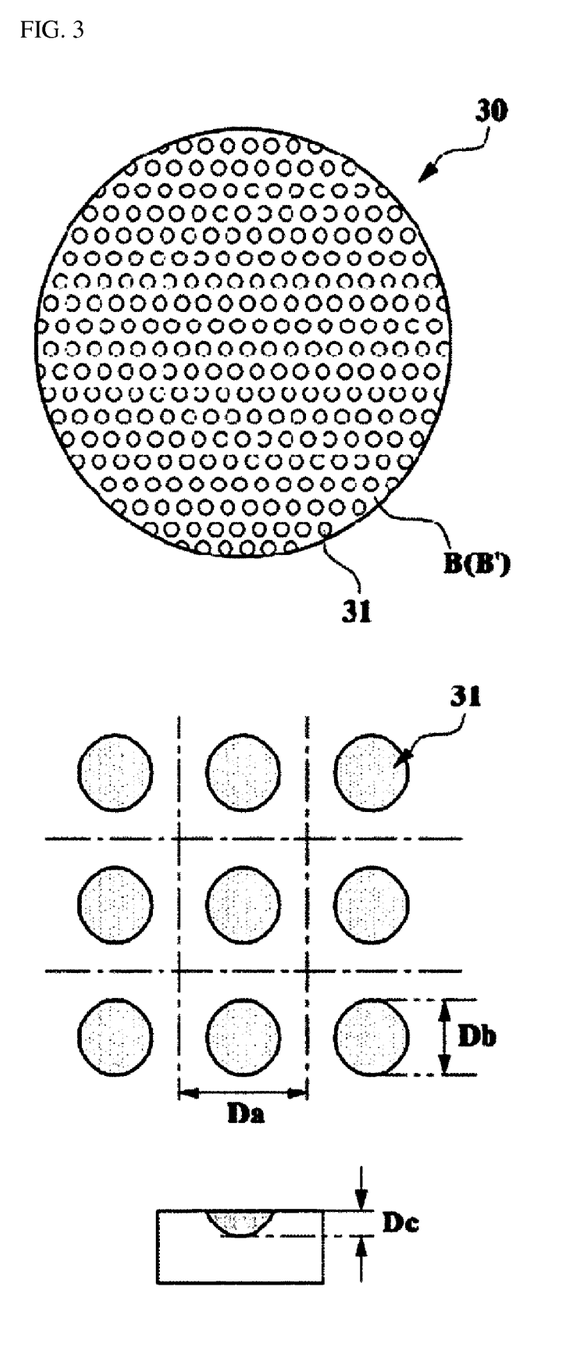
FIG. 3 is an enlarged view showing fine textures of the cylinder device having optimal arrangement of fine textures and optimal surface roughness according to an exemplary embodiment of the present disclosure.

At this time, each of the fine textures 31 is a fine groove of a dimple shape having a circular cross section as shown in FIG. 3. Preferably, the fine groove has a diameter Db of 0.07 to 0.17 mm, a depth Dc of 0.01 to 0.03 mm and a density of 5 to 15%.

The density is a ratio of an area of a square region (as indicated by a dotted line) at which the fine texture 31 is formed in FIG. 3 to an area of the fine texture 31. That is, the density is calculated from $Da^2/(\pi \times r)^2$, where r is Db/2.

As stated above, when the fine texture 31 is processed at an optimal position of the cylinder bore side BS or BS' with an optimal density, since the fine textures contribute to maintain oil films formed by a liquid lubricant staying in the fine textures 31, the fine texture serves to improve a lubrication state and to reduce wear generated on a boundary surface.

Furthermore, when the lubricant supply is low, the lubricant staying in the fine textures 31 is provided, and since wear particles that accelerate the wear are collected in the fine textures 31, it is possible to remarkably reduce a wear speed as a whole.

That is, when the fine textures 31 are too much processed, since an area of a friction part where the fine textures 31 are not processed becomes too small, a surface pressure is concentrated and increased at the friction part, so that friction characteristics are degraded. On the other hand, when the fine textures 31 are too little processed, since an improvement effect is slightly exhibited, fuel consumption and engine oil consumption are prevented from being increased.

Accordingly, in the exemplary embodiment of the present disclosure, by forming the fine textures 31 at an optimal position, even though the piston 20 moves in a straight-line reciprocating motion on the cylinder bore side BS or BS', the lubricant between the piston ring R and the cylinder bore side BS or BS' is suppressed from being in short supply.

Further, it is possible to prevent an operation from being performed in a state where the engine oil is in short supply on the cylinder bore side BS or BS' due to a high combustion pressure and combustion heat caused by operation characteristics of the internal combustion engine.

Meanwhile, in the exemplary embodiment of the present disclosure, since at least a region of the cylinder bore side BS or BS' within a stoke distance S of the piston from at the top dead center TDC of the piston is processed with a surface roughness Ra of 0.18 to 0.40, it is possible to reduce the engine oil consumption with less wear of the piston and the cylinder bore side BS or BS'.

When the surface roughness Ra is less than 0.18, since the piston ring R and the cylinder bore side BS or BS' are excessively matched, the engine oil staying between fine honing grooves is introduced into a combustion chamber of a cylinder head in a rising stroke of the piston 20. For this reason, the engine oil is consumed during the combustion.

Meanwhile, when the surface roughness Ra is more than 0.40, since a frictional force between the piston and the cylinder bore side BS or BS' is excessively large, the piston ring R and the cylinder bore side BS or BS' are severely worn, and the amount of the engine oil staying on the cylinder bore side BS or BS' is also excessively large. As a result, the engine oil is also consumed.

Accordingly, in the exemplary embodiment of the present disclosure, by optimizing the surface roughness RA of the cylinder bore side BS or BS' to 0.18 to 0.40, the engine oil consumption is reduced, so that the cylinder bore and the piston ring R can be prevented from being worn.

Hereinafter, a wear test result for the cylinder device having optimal arrangement of fine textures and optimal surface roughness according to an exemplary embodiment of the present disclosure will be described.

Figure 4:
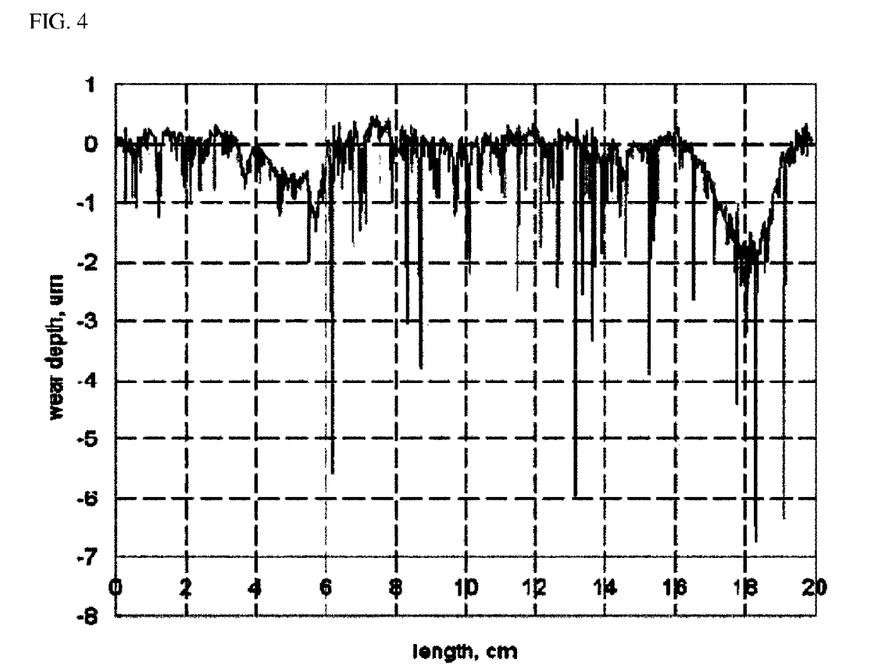
FIG. 4 is a graph showing a distribution of wear on a cylinder bore side of the cylinder device having optimal arrangement of fine textures and optimal surface roughness.

First, in order to verify an optimal processing region of the fine textures 31 capable of reducing wear occurring in the piston ring R and the cylinder bore side BS or BS' of the internal combustion engine, a wear status of the actually used cylinder bore side BS or BS' is measured as shown in FIG. 4.

It can be seen from FIG. 4 that wear is caused the most in a region of 16 to 19 cm within a stroke distance S.

This engine has a stroke distance S of 12.6 cm, and when wear regions of FIG. 4 are written in A, B and S of FIG. 2, the wear regions are represented as A/S=8% and B/S=32%. That is, on the cylinder bore side BS or BS' used in the internal combustion engine, the wear is caused the most in a region where is 8 to 32% of the stroke distance from the top dead center TDC of the cylinder bore side BS or BS'.

This means that the wear is caused the most when friction between the piston ring R and the region of the cylinder bore side BS or BS' is caused, and means that the wear of the piston ring R can be improved by processing the fine textures 31 suggested in the exemplary embodiment of the present disclosure in the region.

In order to verify an effect of improving the wear of the piston ring R by processing the dimple-shaped fine textures 31 proposed in the exemplary embodiment of the present disclosure on the cylinder bore side BS or BS', the wear test is performed as shown in [Table 1] below. At this time, the fine textures 31 have design parameters of a diameter, a depth, and a density. The diameter is represented as Db, the depth is represented as Dc, and the density is calculated from $Da^2/(\pi \times r)^2$, where r is Db/2.

TABLE 1

| | Design Parameter | | Measurement | |
|---|---|---|---|---|
| Specimen | Diameter (μm) | Depth (μm)/ Density (%) | Diameter (μm) | Depth (μm)/ Density (%) |
| 1-1 | 100 | 12/6 | 108 | 13.5/7.9 |
| 1-2 | 100 | 20/16 | 101 | 20.5/15.9 |
| 1-3 | 100 | 30/23 | 95 | 31.2/20.2 |
| 1-4 | 150 | 12/6 | 142 | 14.5/5.8 |
| 1-5 | 150 | 20/16 | 150 | 21.9/15.7 |
| 1-6 | 150 | 30/23 | 163 | 31.4/27.5 |
| 1-7 | 190 | 12/6 | 181 | 12.3/5.2 |
| 1-8 | 190 | 20/16 | 197 | 20.9/15.3 |
| 1-9 | 190 | 30/23 | 198 | 31.4/23.3 |

In the test result of [Table 1], '1-1' and '1-5' having an excellent effect of improving the wear and textures having an intermediate shape thereof are designed as shown in [Table 2] and the wear test is performed five times. The test result is shown in FIG. 5.

TABLE 2

| | Design Parameter | | Measurement | |
|---|---|---|---|---|
| Specimen | Diamter (μm) | Depth (μm)/ Density (%) | Diamter (μm) | Depth (μm)/ Density (%) |
| 2-1 | 100 | 12/6 | 103 | 13.2/7.2 |
| 2 Mid | 120 | 20/10 | 120 | 22.5/10.0 |
| 2-5 | 150 | 20/16 | 148 | 20.9/16.7 |

Figure 5:
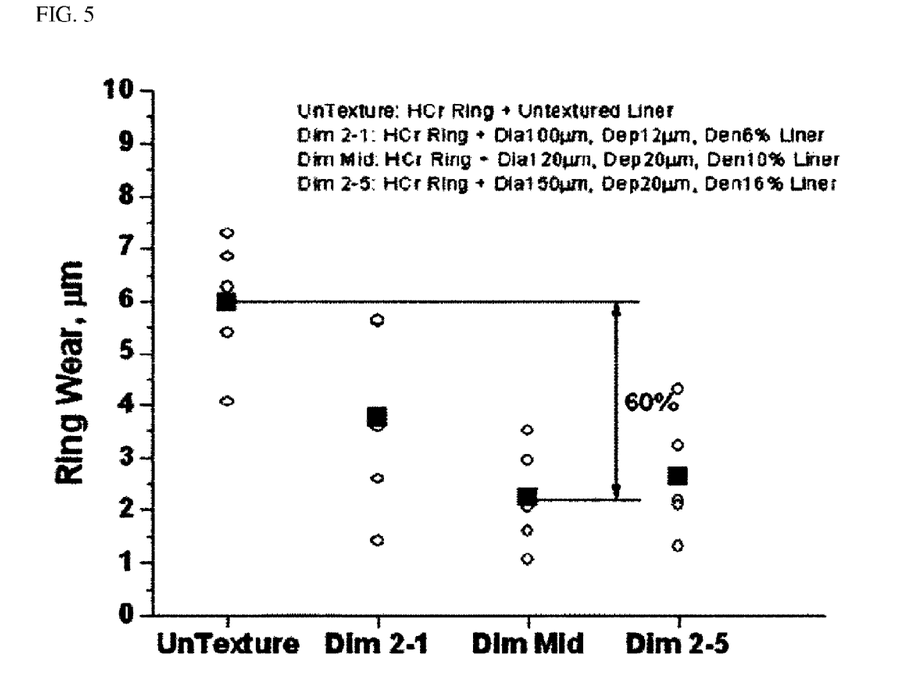
FIG. 5 is a graph showing a wear status of a piston ring in a wear test performed when the fine textures are formed on the cylinder bore side.

In FIG. 5, 'UnTexture' represents the largest amount of wear of the piton ring R when the fine textures 31 of an exemplary embodiment of the present disclosure are not processed, and 'Dim 2-1,' 'Dim Mid,' and 'Dim 2-5' represent the largest amount of wear of the piston ring R when the fine textures 31 of '2-1,' '2 Mid,' and '2-5' of [Table 3] are processed.

As can be seen from FIG. 5, the largest amount of wear of the piston ring R when the fine textures 31 of '2 Mid' are processed on the cylinder bore side BS or BS' is about 40% of the largest amount of the piston ring R when the fine textures 31 are not processed. That is, when the fine textures 31 having a diameter of 0.12 mm, a depth of 0.02 mm and a density of 10% are processed in a region of 8% to 32% within a stroke distance from the top dead center TDC of the cylinder bore side BS or BS', the largest amount of wear of the piston ring R can be reduced by 60%.

Moreover, as in the preceding test, the shape and processing region of the fine textures 31 having the most excellent wear reducing effect are applied onto the cylinder bore side BS or BS' as shown in [Table 3], and a region from the top dead center TDC of the cylinder bore side BS or BS' to the stroke distance S is processed with a surface roughness Ra of 0.12 to 0.41. The engine oil consumption and the amount of wear of the piston ring and the cylinder bore are investigated using the processed specimens.

Figure 6:
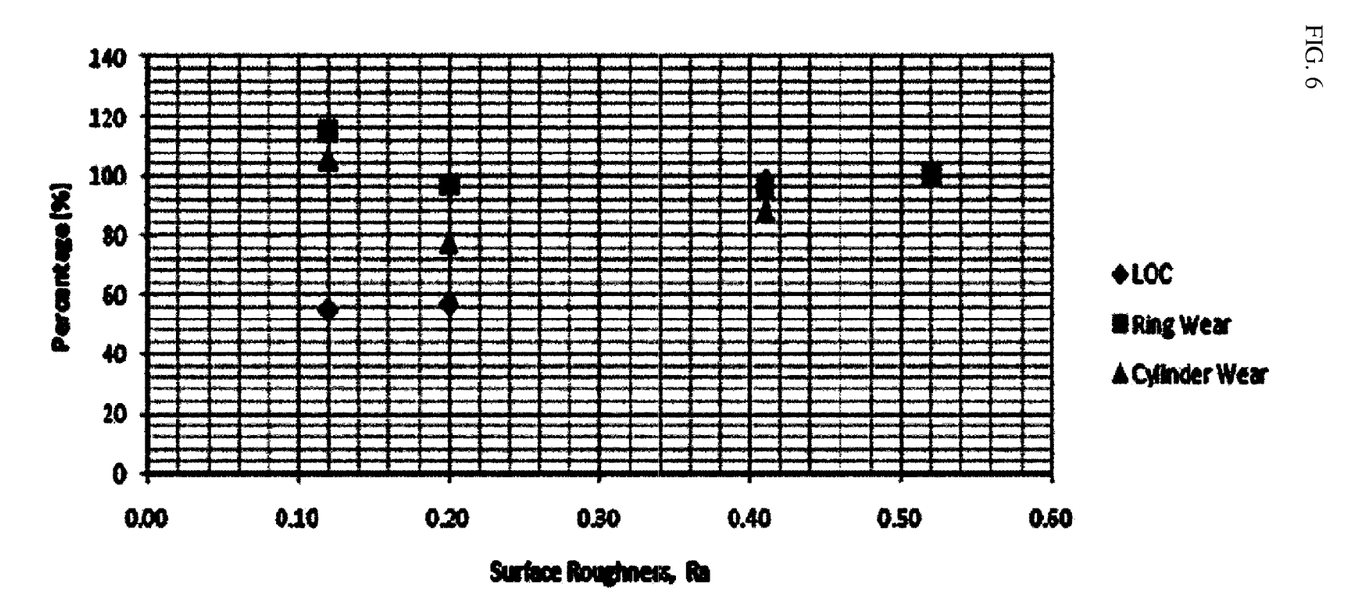
FIG. 6 is a graph showing a wear status in a wear test performed when surface roughness on the cylinder bore side is adjusted.

FIG. 6 shows a test result of [Table 3].

TABLE 3

| Specimen | Design Parameter | | | Test Result | | |
| --- | --- | --- | --- | --- | --- | --- |
| | Diameter (μm) | Depth (μm)/ Density (%) | Ra | LOC (%) | Ring Wear (%) | Cylinder Bore Wear (%) |
| 2-1, base | — | — | 0.52 | 100 | 100 | 100 |
| 2-2 | 120 | 20/10 | 0.41 | 98 | 96 | 88 |
| 2-3 | 120 | 20/10 | 0.12 | 57 | 97 | 77 |
| 2-4 | 120 | 20/10 | 0.12 | 55 | 115 | 105 |

(where LOC is an abbreviation for lubricant oil consumption)

As can be seen from FIG. 6, the engine oil consumption is reduced in all specimens having surface roughness Ra lower than a base specimen. This is because that the surface roughness Ra of the cylinder bore side BS or BS' is reduced within the stroke distance S of the piston, since the amount of oil staying on the cylinder bore side BS or BS' is decreased, the amount of oil introduced into the combustion chamber is also decreased.

Further, the amount of wear of the cylinder bore side BS or BS' and the piston ring R are also further decreased than the base specimen. However, when the surface roughness Ra is too low, the amount of oil staying on the cylinder bore side BS or BS' is small, and thus the lubrication status of the piston ring R and the cylinder bore side BS or BS' is degraded. For this reason, the wear of the piston ring R is further increased.

Accordingly, it can be seen through the present test that when the region from the top dead center TDC of the cylinder bore side BS or BS' to the stroke distance S is processed with a surface roughness Ra of 0.12 to 0.41, the engine oil consumption can be reduced up to 57% of the current engine oil consumption level.

Moreover, in order to reduce the engine oil consumption and to suppress the wear of the piston ring R and the cylinder bore side BS or BS' from being increased, it is preferable to set the surface roughness Ra of the cylinder bore side BS or BS' to 0.18 to 0.40.

Figure 7:
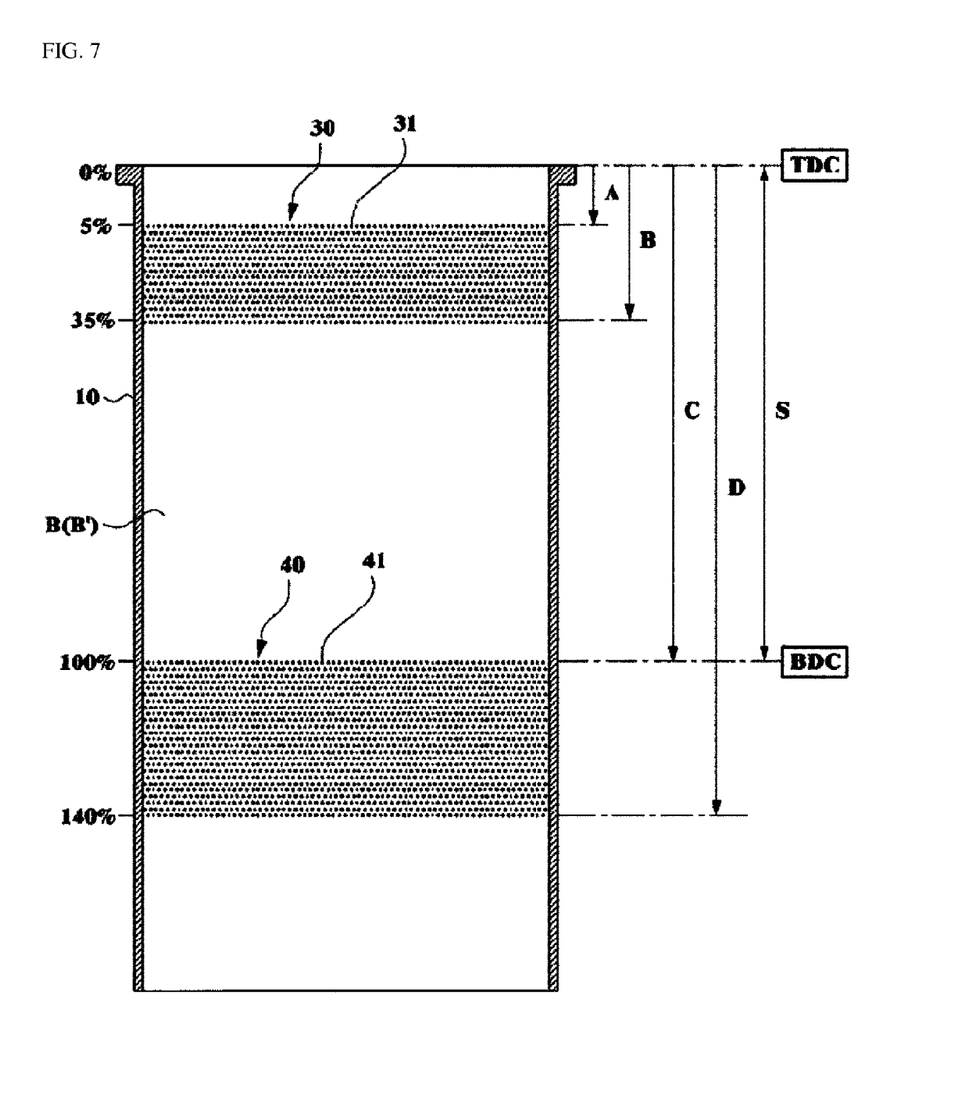
FIG. 7 is a partial view of a cylinder device having improved wear resistance through optimal arrangement of fine textures according to another exemplary embodiment of the present disclosure.

Furthermore, as shown in FIG. 7, a cylinder device having improved wear resistance through optimal arrangement of fine textures according to another exemplary embodiment of the present disclosure includes a first texture section 30 that is formed on a cylinder bore side BS or BS' within a cylinder block 10 and is formed near top dead center TDC of a piston 20 moving in a straight-line reciprocating motion within a stroke distance S and a second texture section 40 that is formed near bottom dead center BDC thereof.

At this time, in order to reduce friction and wear by forming fine textures on the cylinder bore side BS or BS', it is required to optimally decide the shape, arrangement and processing region of the fine textures, and the shape, arrangement and processing region of the fine textures capable of minimizing friction and wear are affected by operating conditions such as a contact type, a load, and a sliding speed of two surfaces.

For example, the shape and arrangement of the textures capable of minimizing friction and wear are changed depending on a contact type of contact portions such as line contact, point contact, or surface contact. Accordingly, it is required to firstly decide an operating environment or operating condition prior to the development of a surface texture technology capable of reducing friction and wear, and it is required to select the shape and arrangement of the fine textures under the decided operating environment or operating condition.

Accordingly, in the another exemplary embodiment of the present disclosure, the first texture section 30 is formed by processing a plurality of fine textures 31 in a region (between A and B) of 5% to 35% from the top dead center TDC of the piston 20 moving in a straight-line reciprocating motion along the cylinder bore side BS or BS'.

In addition, the second texture section 40 is formed on the cylinder bore side BS or BS' within the cylinder block 10, and is formed by processing a plurality of fine textures 41 in a region (between C and D) of 100% to 140% from the top dead center TDC of the piston 20.

The first texture section 30 is a set of the plurality of fine textures 31, and is continuously formed in a circumferential direction of the cylinder bore side BS or BS'. Further, as shown in FIG. 3, each of the fine textures 31 is a fine groove of a dimple shape having a circular cross section, and the fine groove has preferably a diameter Db of 100 to 150 μm, a depth Dc of 10 to 20 μm, and an arrangement distance Da of 350 μm to 450 μm.

As described above, when the fine textures 31 and 41 are processed at an optimal position of the cylinder bore side BS or BS' with an optimal density, since the fine textures contribute to maintain oil films formed by a liquid lubricant collected in the fine textures 31 and 41, the fine textures serve to improve a lubrication state and to reduce wear caused on a boundary surface.

When the fine textures 31 and 41 are too much processed, since an area of a friction part where the fine textures 31 and 41 are not processed becomes too small, a surface pressure is concentrated and increased at the friction part, so that friction characteristics are degraded. On the other hand, when the fine textures 31 and 41 are too little processed, since an improvement effect is slightly exhibited, fuel consumption and engine oil consumption are increased.

Accordingly, in the exemplary embodiment of the present disclosure, by optimally forming the fine textures 31 as mentioned above, even though the piston 20 moves in a straight-line reciprocating motion on the cylinder bore side BS or BS', the lubricant between the piston ring R and the cylinder bore side BS or BS' is suppressed from being in short supply. Further, it is possible to prevent an operation from being performed in a state where the engine oil is in short supply on the cylinder bore side BS or BS' due to a high combustion pressure and combustion heat caused by operation characteristics of the internal combustion engine.

Hereinafter, a cylinder device having improved wear resistance through optimal arrangement of fine textures according to still another exemplary embodiment of the present disclosure will be explained.

Figure 8:
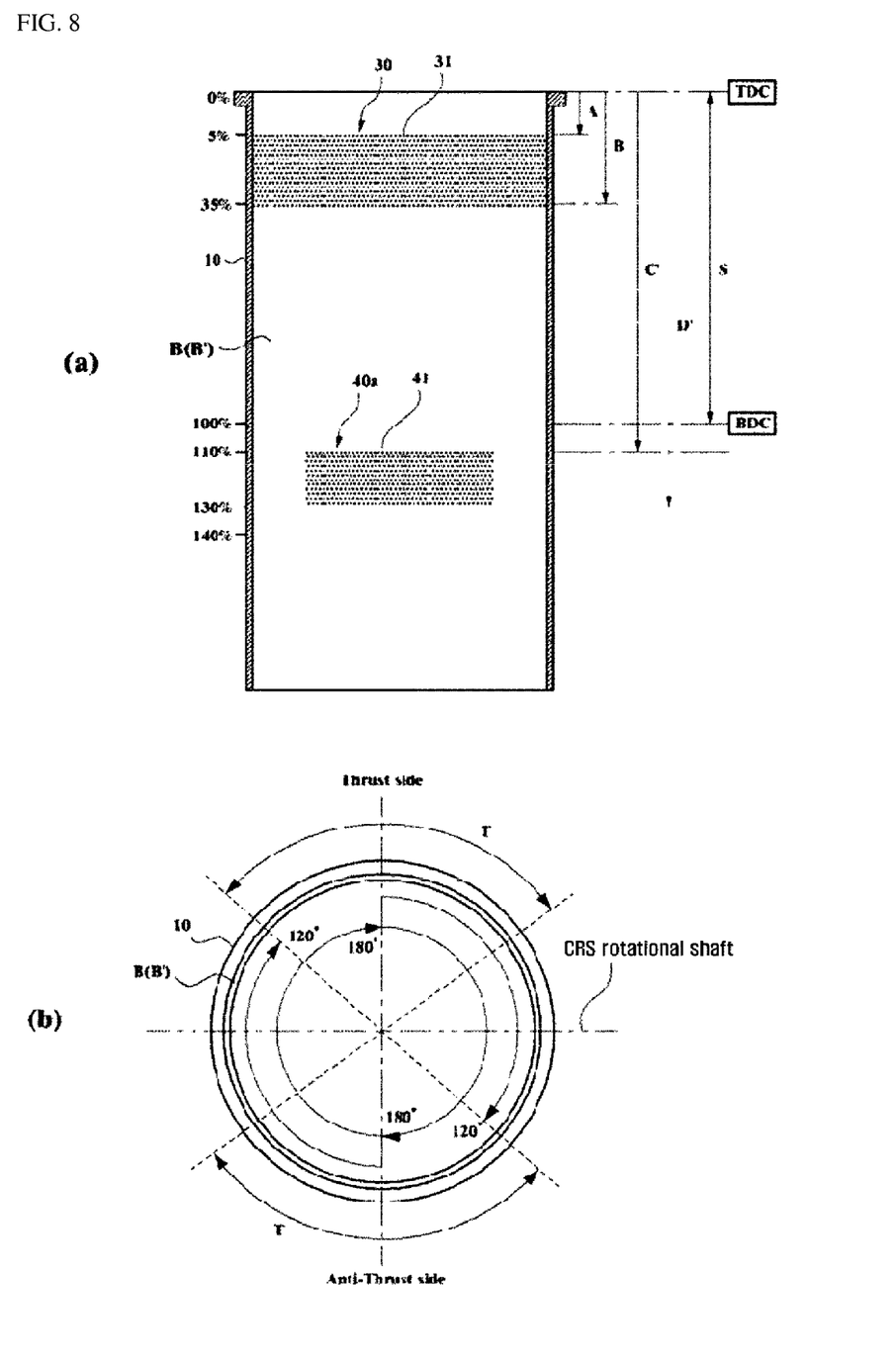
FIG. 8 is a partial view illustrating a cylinder device having improved wear resistance through optimal arrangement of fine textures according to still another exemplary embodiment of the present disclosure.

As shown in (a) of FIG. 8, the cylinder device having improved wear resistance through optimal arrangement of fine textures according to the still another exemplary embodiment of the present disclosure includes a first texture section 30 that is formed on a cylinder bore side BS or BS' within a cylinder block 10 and is formed near top dead center TDC of a piston 20 moving in a straight-line reciprocating motion within a stroke distance S and a second texture section 40a that is formed near bottom dead center BDC thereof.

The first texture section 30 is formed by processing a plurality of fine textures 31 in a region (between A and B) of 5% to 35% from the top dead center TDC of the piston 20 moving in a straight-line reciprocating motion along the cylinder bore side BS or BS'. The first texture section 30 is continuously formed in a circumferential direction of the cylinder bore side BS or BS', and is formed similarly to the aforementioned another exemplary embodiment of the present disclosure.

However, since the second texture section 40a is formed by processing a plurality of fine textures 41 in a range (between C' and D') of 110% to 130% from the top dead center TDC of the piston 20, the second texture section is different from the second texture section of the another exemplary embodiment of the present disclosure formed by processing the fine textures 41 in the region (between C and D) of 100% to 140% from the top dead center TDC of the piston 20.

Further, in the still another exemplary embodiment of the present disclosure, as shown in (b) of FIG. 8, the second texture section 40a is formed in a range of 120° to 180° from a central point of a thrust side existing on the cylinder bore side BS or BS' or is formed in a range of 120° to 180° from a central point of an anti-thrust side.

The second texture section may be naturally formed in both of the range of 120° to 180° from the central point of the thrust side and the range of 120° to 180° from the central point of the anti-thrust side. For this reason, the second texture section is different from the second texture section of the another exemplary embodiment of the present disclosure formed by processing the fine textures 41 in the circumferential direction of the cylinder bore side BS or BS'.

As shown in (b) of FIG. 8, the second texture section 40a may be formed in a range of 120° to 180° in a clockwise direction by using a direction (that is, the central point of the thrust side or anti-thrust side) perpendicular to a 'CRS rotational shaft' which is a rotational axis of a crankshaft 23 as a reference point or may be formed in a range of 120° to 180° in a counterclockwise direction.

Similarly to the another exemplary embodiment of the present disclosure described with reference to FIG. 3, each of the fine textures 41 of the second texture section 40a is a fine groove of a dimple shape having a circular cross section, and the fine groove has a diameter Db of 100 to 150 µm, a depth Dc of 10 to 20 µm, and an arrangement distance Da of 350 µm to 450 µm.

As stated above, in the still another exemplary embodiment of the present disclosure, the fine textures 31 and 41 are formed on the thrust side and the anti-thrust side, which are positioned near the top dead center TDC and the bottom dead center BDC causing a rapid change in an instantaneous speed of the piston 20 moving in a straight-line reciprocating motion and cause a pivoting motion of a piston secondary motion.

That is, the piston 20 is lowered while being tilted toward one side around a piston pin 21 due to a distribution of a pressure applied to a top surface of the piston 20 due to an explosive pressure of an engine combustion chamber or a frictional force between the piston ring R and the cylinder bore side BS or BS'.

At this time, an outer surface in a direction in which the piston 20 is tilted is called the thrust side, and a surface in a direction opposite to the direction is called the anti-thrust side. In the exemplary embodiment of the present disclosure, the fine textures 31 and 41 are formed on sides of the cylinder bore side BS or BS' corresponding to the thrust side and the anti-thrust side, so that it is possible to reduce friction and wear.

Accordingly, it is possible to remarkably reduce serious wear caused by bringing the cylinder bore side BS or BS' into contact with the piston ring R and by bringing the cylinder bore side BS or BS' into contact with the entire piston 20 including a piston skirt 20a due to the pivoting motion of the secondary motion.

Hereinafter, a wear test result for the cylinder device having improved wear resistance through optimal arrangement of fine textures according to an exemplary embodiment of the present disclosure will be described.

Figure 9:
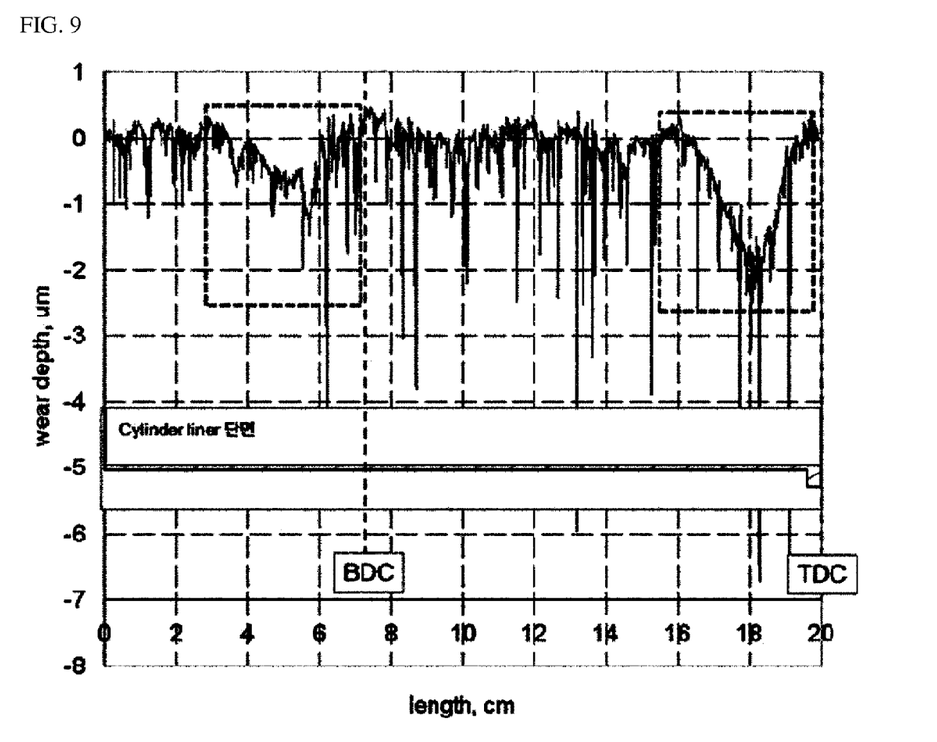
FIG. 9 is a graph showing a distribution of wear on a cylinder bore side of the cylinder device having improved wear resistance through optimal arrangement of fine textures according to an exemplary embodiment of the present disclosure.

First, in order to verify an optimal processing region of the fine textures 31 and 41 capable of reducing wear caused on the cylinder bore side BS or BS' and the piston ring R of the internal combustion engine, a wear status of the actually used cylinder bore side BS or BS' is measured as shown in FIG. 9.

As can be seen from FIG. 9, wear is caused the most in a region of 16 to 19 cm and a region of 4 to 6 cm. This engine has a stroke distance S of 12.6 cm, and when wear regions of FIG. 9 are written in A, B, C, D and S of FIG. 8, the wear regions are represented as A/S=8%, B/S=32%, C/S=110%, and D/S=135%.

That is, on the cylinder bore side BS or BS' used in the internal combustion engine, the largest amount of wear is caused the most in regions of 8 to 32% and 110 to 135% of the stroke distance S from the top dead center TDC of the cylinder side bore BS or BS'.

The circular fine textures 31 and 41 are processed in rectangular arrangement such that the fine textures 31 and 41 has a diameter Db of 100 mm, a depth Dc of 15 mm, and an arrangement distance Da of 350 mm. Further, as shown in FIG. 8, the first texture section 30 near the top dead center TDC is processed on the entire cylinder bore side BS or BS', and the second texture section 40a near the bottom dead center BDC is processed on only a part of the thrust and anti-thrust regions of the engine.

This is because that the piston 20 and the cylinder bore side BS or BS' are likely to come in direct contact with each other due to the secondary motion in the region of the bottom dead center BDC rather than the region of the top dead center TDC, and a processing region is set by taking account of the skirt 20a of the piston 20 in order to reduce wear caused by the direction contact.

TABLE 4

| | Design Parameter | | | |
| --- | --- | --- | --- | --- |
| Specimen | Lenght (A-B) Processing Region of Fine Textures from TDC | Length 2 (C-D) of Processing Region of Fine Textures from TDC (% near BDC) | Angle (T) of Processing Region of Fine Texture near | Average Data Ring & Cylinder liner Wear (μm) |
| Example 1 | 5~25% | 100~120% | 120° × 2/360° | 12.15 |
| Example 2 | 5~25% | 110~130% | 150° × 2/360° | 10.98 |
| Example 3 | 5~25% | 120~140% | 180° × 2/360° | 14.21 |
| Example 4 | 10~30% | 100~120% | 150° × 2/360° | 12.75 |
| Example 5 | 10~30% | 100~130% | 180° × 2/360° | 11.35 |
| Example 6 | 10~30% | 120~140% | 120° × 2/360° | 13.97 |
| Example 7 | 15~35% | 100~120% | 180° × 2/360° | 12.45 |
| Example 8 | 15~35% | 100~130% | 120° × 2/360° | 11.98 |
| Example 9 | 15~35% | 120~140% | 150° × 2/360° | 13.86 |

As mentioned above, this means that a thickness of an oil film between the piston ring R and the cylinder bore side BS or BS' is decreased in both end regions of the stroke distance S where a moving direction of the piston 20 is changed to increase friction, and thus the wear is caused the most.

Moreover, this is means that when the fine textures 31 and 41 suggested in the exemplary embodiment of the present disclosure are processed in an optimal arrangement region decided by taking account of the aforementioned operation characteristics, it is possible to achieve an optimal state capable of reducing the wear of the piston ring R and the cylinder bore side BS or BS'.

Next, in order to verify a wear improving effect of the piston ring R and cylinder bore through an optimal arrangement condition of the fine textures 31 and 41 suggested in the present disclosure, a wear test is performed as shown in [Table 4] below.

'Example 2' and 'Example 5' of [Table 4] exhibit an excellent wear improving effect in the test result, but since the examples are not optimized, 'Example 10' in which a maximum improvement effect is expected is derived by statistically analyzing nine test results of [Table 4].

The result is shown in [Table 5]. 'Comparative Example' represented in [Table 5] is a test result when the fine textures 31 and 41 are not processed. As can be seen from [Table 5], the amount of wear of 'Example 10' is improved by 45% or more than the amount of wear of 'Comparative Example,' and an excellent wear improving effect is more exhibited than other 'Examples 1 to 9.'

That is, it can be seen that when the fine textures 31 and 41 are disposed in regions of 10 to 30% and 110 to 130% within the entire stroke distance S from the top dead center TDC and regions of 150° of the cylinder bore side BS or BS' in the thrust and anti-thrust direction, the wear can be reduced by 45% or more.

TABLE 5

| | Design Parameter | | | |
| --- | --- | --- | --- | --- |
| Specimen | Lenth (A-B) of Processing Region of Fine Textures from TDC | Length 2 (C-D) Processing Region of fine Textures from TDC (% near BDC) | Angle (T) of Processing Region of fine Textures near BDC | Average Data Ring & Cylinder liner Wear (μm) |
| Example 10 | 10~30% | 110~130% | 150° × 2/360° | 9.06 |
| Comparative Example | — | — | — | 16.21 |

In order to further optimally reduce the wear of the piston ring R and the cylinder bore side BS or BS' on the basis of the test result, a wear test is performed as shown in [Table 6] by using a diameter Db, a depth Dc and an arrangement distance Da of the circular fine textures 31 and 41 as design parameters. At this time, the processing region of the fine textures 31 and 41 is set to be equal to that of 'Example 10.'

TABLE 6

| Specimen | Design Parameter | | | Average Data |
|---|---|---|---|---|
| | Diameter (μm) | Depth (μm) | Span (μm) | Wear (μm) |
| Example 11 | 100 | 10 | 350 | 10.26 |
| Example 12 | 100 | 15 | 400 | 7.73 |
| Example 13 | 100 | 20 | 450 | 9.27 |
| Example 14 | 120 | 10 | 400 | 8.31 |
| Example 15 | 120 | 15 | 450 | 7.42 |
| Example 16 | 120 | 20 | 350 | 9.53 |
| Example 17 | 150 | 10 | 450 | 11.45 |
| Example 18 | 150 | 15 | 350 | 12.88 |
| Example 19 | 150 | 20 | 400 | 11.2 |

'Example 12' and 'Example 15' exhibit an excellent wear improving effect in the test result, but since the examples are not optimized, 'Example 20' in which a maximum improvement effect is expected is derived by statistically analyzing nine test results of [Table 6]. The result is represented in [Table 7].

TABLE 7

| Specimen | Design Parameter | | | Average Data |
|---|---|---|---|---|
| | Diameter (μm) | Depth (μm) | Span (μm) | Wear (μm) |
| Example 10 | 100 | 15 | 350 | 9.06 |
| Example 20 | 120 | 15 | 400 | 6.73 |
| Comparative Example | — | — | — | 16.21 |

'Example 10' represented in [Table 7] is a test result before the design parameters of the circular fine textures 31 and 41 are optimized, and 'Comparative Example' is a test result when the fine textures 31 and 41 are not processed.

As can be seen from [Table 7], the amount of wear of 'Example 20' is improved by 58% or more than the amount of wear of 'Comparative Example,' and exhibits a more excellent wear improving effect than the amount of wear of 'Example 10.'

That is, it can be seen that when the circular fine textures 31 and 41 having a diameter Db of 120 mm, a depth Dc of 15 mm and an arrangement distance Da of 400 mm are processed in the region of 'Example 10,' the wear of the piston ring R and the cylinder bore side BS or BS' can be reduced by approximately 60%.

Although the present disclosure has been described in connection with the particular exemplary embodiments, the scope and spirit of the present disclosure is not to be restricted by the particular exemplary embodiments. It is to be appreciated that those skilled in the art can change or modify the exemplary embodiments in various manners without departing from the gist of the present disclosure.

Accordingly, the above-described exemplary embodiments are provided to completely inform those skilled in the art of the scope of the present disclosure, and it should be understood that the exemplary embodiments are merely examples and are not limited in all aspects. The present disclosure is defined by only the scope of the claims.

The present disclosure can be used for a cylinder device having improved wear resistance through optimal arrangement of fine textures capable of reducing wear of a piston ring and a cylinder bore side due to friction.

Although the present disclosure has been described with reference to exemplary and preferred embodiments, workers skilled in the art will recognize that changes may be made in form and detail without departing from the spirit and scope of the disclosure.

The invention claimed is:

1. A cylinder device having improved wear resistance for use with an engine, comprising:
   a first texture section that is formed on a cylinder bore side (BS or BS') within a cylinder block, the first texture section having a first plurality of fine textures only in a region of 5% to 35% from top dead center (TDC) of a piston which is configured to move in a straight-line reciprocating motion along the cylinder bore side (BS or BS');
   a second texture section that is formed on the cylinder bore side (BS or BS') within the cylinder block, the second texture section having a second plurality of fine textures only in a range of 110% to 130% from the top dead center of the piston,
   wherein the second texture section is formed in a range of 120° to 180° from a central point of a thrust side existing on the cylinder bore side (BS or BS'), is formed in a range of 120° to 180° from a central point of an anti-thrust side existing on the cylinder bore side (BS or BS'), or is formed in both of the range of 120° to 180° from the central point of the thrust side and the range of 120° to 180° from the central point of the anti-thrust side;
   a first section that is formed on the cylinder bore side (BS or BS') within the cylinder block, the first section disposed between the first texture section and the second texture section without the fine textures; and
   a second section that is formed on the cylinder bore side (BS or BS') within the cylinder block without the fine textures, wherein the range of 110% to 130% from the top dead center of the piston includes the second section and the second texture section.

2. The cylinder device of claim 1, wherein the fine textures of the first texture section and second texture section are fine grooves having a dimple shape of a circular cross section.

3. The cylinder device of claim 2, wherein the fine grooves have a diameter (Db) of 100 μm to 150 μm, a depth (Dc) of 10 μm to 20 μm, and an arrangement distance (Da) of 350 μm to 450 μm.

4. The cylinder device of claim 1, wherein the fine textures are fine grooves having a dimple shape of a circular cross section.

5. The cylinder device of claim 4, wherein the fine grooves have a diameter (Db) of 0.07 mm to 0.17 mm, a depth (Dc) of 0.01 mm to 0.03 mm, and a density of 5% to 15%.

6. The cylinder device of claim 1, wherein a region of the cylinder bore side (BS or BS') within a stroke distance (S) of the piston has a surface roughness (Ra) of 0.18 to 0.40.

* * * * *